US009416732B2

(12) United States Patent
Haugsjaahabink et al.

(10) Patent No.: US 9,416,732 B2
(45) Date of Patent: Aug. 16, 2016

(54) ENGINE MANIFOLD DRAIN SYSTEM

(71) Applicant: Hamilton Sundstrand Corporation, Windsor Locks, CT (US)

(72) Inventors: Todd Haugsjaahabink, Springfield, MA (US); Charles E. Reuter, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 654 days.

(21) Appl. No.: 13/803,421

(22) Filed: Mar. 14, 2013

(65) Prior Publication Data

US 2014/0260301 A1 Sep. 18, 2014

(51) Int. Cl.
*F02C 7/22* (2006.01)
*F02C 7/232* (2006.01)

(52) U.S. Cl.
CPC . *F02C 7/232* (2013.01); *F02C 7/22* (2013.01); *F02C 7/222* (2013.01)

(58) Field of Classification Search
CPC ............ F02C 7/22; F02C 7/222; F02C 7/232; F02C 7/236
USPC ................................ 60/39.094, 734
See application file for complete search history.

(56) References Cited

U.S. PATENT DOCUMENTS

| | | | | |
|---|---|---|---|---|
| 2,881,827 A | * | 4/1959 | Roche | F02C 7/232 60/39.094 |
| 4,041,695 A | * | 8/1977 | Harper | F02C 7/232 60/39.094 |
| 4,206,595 A | * | 6/1980 | Cole | F02C 7/22 60/39.094 |
| 5,809,771 A | * | 9/1998 | Wernberg | F02C 7/232 60/39.094 |
| 6,195,978 B1 | | 3/2001 | Futa, Jr. | |
| 6,682,016 B1 | | 1/2004 | Peroulakis | |
| 6,751,939 B2 | * | 6/2004 | Futa, Jr. | F02C 7/232 60/39.094 |
| 6,807,801 B2 | | 10/2004 | McCarty | |
| 8,083,204 B2 | * | 12/2011 | Maker | F02C 7/232 251/28 |
| 8,127,524 B2 | | 3/2012 | Falke et al. | |
| 2010/0050593 A1 | * | 3/2010 | Futa | F02C 7/232 60/39.094 |
| 2012/0073301 A1 | | 3/2012 | Paradise | |
| 2012/0186673 A1 | | 7/2012 | Heitz | |
| 2013/0000318 A1 | * | 1/2013 | Dalton | F02C 7/222 60/39.094 |

OTHER PUBLICATIONS

GTA160-10 Normal Mode Schematic, Maintenance Manual for GTA160-10, Dec. 1997.

* cited by examiner

*Primary Examiner* — Thai Ba Trieu
*Assistant Examiner* — Ngoc T Nguyen
(74) *Attorney, Agent, or Firm* — Kinney & Lange, P.A.

(57) ABSTRACT

A fuel system for a gas turbine engine includes an engine fuel manifold, a hydraulic actuator, and a drain piston assembly. The hydraulic actuator actuates in response to a change in pressures within the hydraulic actuator. The drain piston assembly is fluidically connected to both the hydraulic actuator and the engine fuel manifold. The drain piston assembly receives fuel from the engine fuel manifold and sends fuel to the hydraulic actuator during engine shut down.

20 Claims, 3 Drawing Sheets

ENGINE MANIFOLD DRAIN SYSTEM

BACKGROUND

The present invention relates to gas turbine engines, and in particular, to a fuel system for a gas turbine engine. Gas turbine engines typically include one or more fuel manifolds that receive fuel from a main fuel tank and deliver that fuel to a combustor section for combustion. When the gas turbine engine is shut down, fuel remaining in the fuel manifold can drain into the combustion chamber, and ultimately evaporate and/or drain out of the gas turbine engine onto the ground. This can be undesirable for ecological reasons.

Some gas turbine engines include an ecology tank for storing fuel from the fuel manifold after engine shut down. Such systems typically include a number of components, such as an ejector pump, check valves, vents, plumbing, and the ejector tank. These components can undesirably increase the cost, complexity, and weight of the fuel system. Some gas turbine engines drain fuel from the fuel manifold and send it back to the main fuel tank. But a main inlet line from the fuel tank to one or more pumps often has a check valve or pilot-operated valve preventing backflow during shutdown, keeping the pumps primed with fuel. These engines can drain fuel manifolds by using a second plumbing line from the fuel manifold back to the fuel tank. This second plumbing line often has a second function of sending excess fuel back to the fuel tank to assist in pressurizing the fuel inlet line for improved pump performance. But not all aircraft have a second plumbing line returning to the fuel tank for various functional and operation reasons.

SUMMARY

According to the present invention, a fuel system for a gas turbine engine includes an engine fuel manifold, a hydraulic actuator, and a drain piston assembly. The hydraulic actuator actuates in response to a change in pressures within the hydraulic actuator. The drain piston assembly is fluidically connected to both the hydraulic actuator and the engine fuel manifold. The drain piston assembly receives fuel from the engine fuel manifold and sends fuel to the hydraulic actuator during engine shut down.

Another embodiment is a method including flowing fuel from an aircraft fuel tank to a fuel manifold of a gas turbine engine when the gas turbine engine is operating. Fuel also flows from the engine manifold to a drain piston assembly and from the drain piston assembly to a hydraulic actuator when the gas turbine engine is shut down.

Another embodiment is a method for draining an engine fuel manifold. The method includes flowing fuel from a fuel pump to a drain piston assembly to move a piston in the drain piston assembly from a first position to a second position, flowing fuel from the drain piston assembly to a hydraulic actuator as the piston moves from the first position to the second position, and flowing fuel from the engine fuel manifold to the drain piston assembly when the piston moves from the first position to the second position.

DETAILED DESCRIPTION

Figure 1:
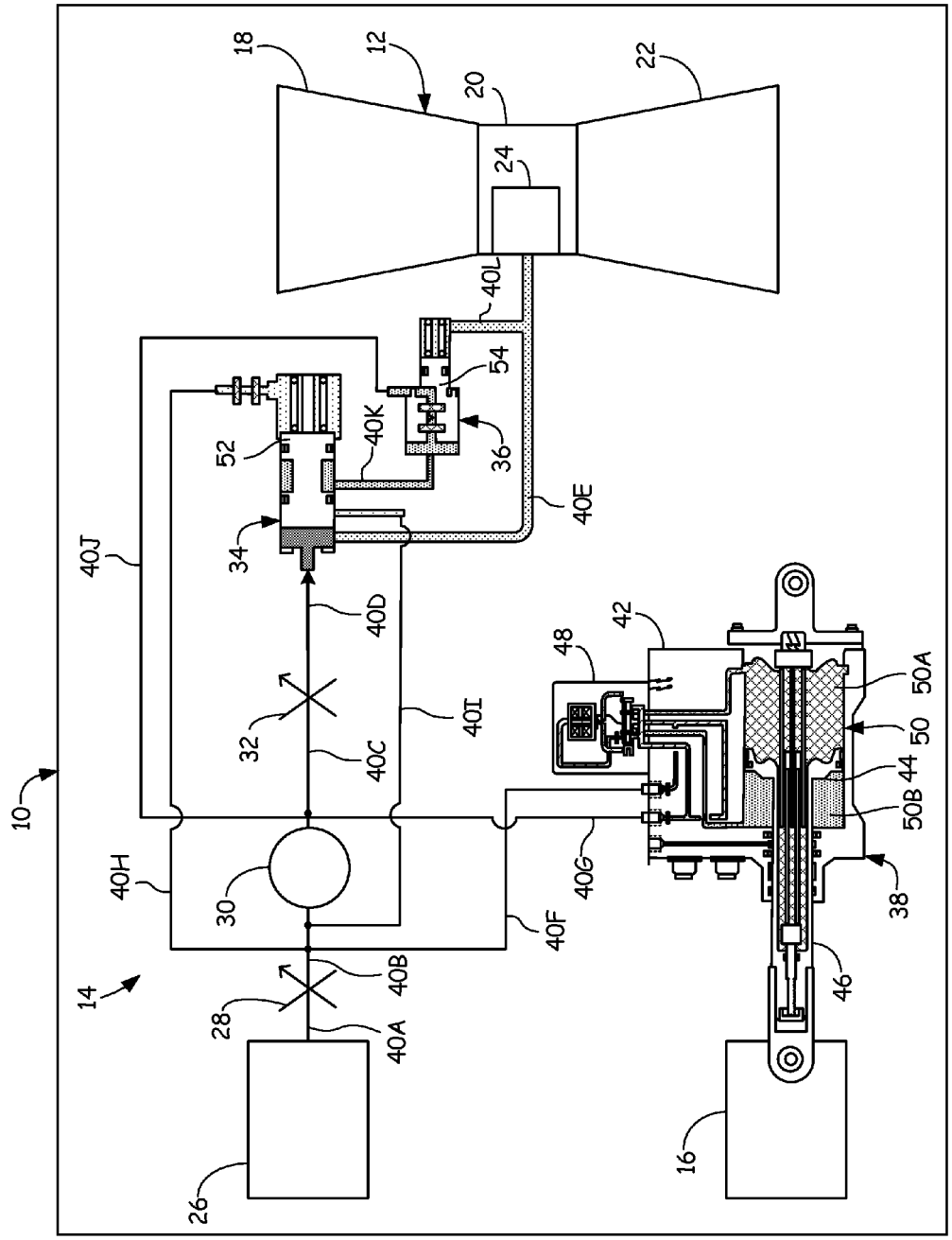
FIG. 1 is schematic system diagram of an aircraft having a fuel system.

FIG. 1 is a schematic system diagram of aircraft 10 having gas turbine engine 12, fuel system 14, and actuated component 16. Gas turbine engine 12 includes compressor section 18, combustor section 20, and turbine section 22. Fuel manifold 24 receives fuel from fuel system 14 for supplying fuel to combustor section 20 for combustion. Gas turbine engine 12 can be any type of gas turbine engine, such as a propulsion engine or an auxiliary power unit on aircraft 10. In an alternative embodiment, gas turbine engine 12 can be used without aircraft 10, such as in an industrial application or on a sea vessel. Gas turbine engine 12 operates by compressor section 18 compressing gas and combustor section 20 mixing fuel with the compressed gas and combusting that mixture. Turbine section 22 is then driven by the combusted mixture of fuel and gas to turn compressor section 18 and one or more additional components, such as a fan, generator, pump, etc. (not shown).

Fuel manifold 24 is part of both gas turbine engine 12 and fuel system 14. Fuel system 14 also includes tank 26, valve 28, pump 30, metering valve 32, minimum pressure and shut off valve (MPSOV) 34, drain piston assembly 36, and actuator 38, all fluidically connected by passages 40A-40L. In various embodiments, fuel system 14 can include one or more additional components, such as sensors, filters, valves, pumps, heat exchangers, controllers, etc.

Tank 26 is a main fuel reservoir for storing fuel for use by one or more gas turbine engines 12 and actuators 38. Valve 28 is connected to tank 26 via passage 40A for allowing flow from tank 26 through passages 40A and 40B but limiting fuel flow in an opposite direction. Pump 30 is a fuel pump connected to valve 28 via passage 40B. Pump 30 pumps fuel from tank 26 to fuel manifold 24 of gas turbine engine 12. Metering valve 32 is connected to an outlet of pump 30 via passage 40C. Metering valve 32 can be actuated to increase or decrease flow of fuel from pump 30 to fuel manifold 24.

MPSOV 34 is a valve that is connected to metering valve 32 via passage 40D. MPSOV 34 is configured to shut off fuel flow through fuel system 14. MPSOV 34 is also configured to allow fluid flow from passage 40D through MPSOV 34 to passage 40E when pressure in passage 40D exceeds a threshold and to limit flow through MPSOV 34 when pressure in passage 40D is below that threshold. By limiting fuel flow when pressure in passage 40D is below the threshold, MPSOV 34 can ensure a minimum pressure upstream of MPSOV 34 for use by actuator 38.

Fuel manifold 24 is connected to MPSOV 34 via passage 40E. Fuel manifold 24 receives fuel from passage 40E and delivers that fuel to combustor section 20 of gas turbine engine 12. During normal operation of gas turbine engine 12, fuel flows from tank 26, through valve 28, through pump 30, through metering valve 32, through MPSOV 34, to fuel manifold 24.

Actuator 38 is a hydraulic actuator fluidically connected to passage 40B via passage 40F and fluidically connected to passage 40C via passage 40G. Actuator 38 includes housing 42, piston 44, shaft 46, and servo valve 48. Housing 42 defines cylinder 50 which is fluidically connected to passages 40F and 40G for receiving fuel therefrom. Piston 44 is positioned in cylinder 50 to divide cylinder 50 into chambers 50A and

50B. Shaft 46 connects piston 44 to actuated component 16. Shaft 46 is a hollow shaft that contains fuel, is fluidically connected to chamber 50A, and is substantially fluidically isolated from chamber 50B. Shaft 46 extends from piston 44, through chamber 50B, through housing 42 to connect to actuated component 16.

When pump 30 pumps fuel through fuel system 14, pressure downstream of pump 30 (in passages 40C and 40G) is greater than pressure upstream of pump 30 (in passages 40B and 40F). Servo valve 48 can be an electro-hydraulic servo-valve (EHSV) that is controlled by an electronic engine control (EEC) (not shown). Servo valve 48 can selectively connect each of passages 40G and 40F to each of chambers 50A and 50B to selectively extend or retract shaft 46 of actuator 38. For example, if servo valve 48 connects passage 40G (which has relatively high pressure) to chamber 50A and connects passage 40F (which has relatively low pressure) to chamber 50B, the pressure in chamber 50A will push piston 44 to the left (as depicted in FIG. 1) to extend shaft 46. If, on the other hand, servo valve 48 connects passage 40G (which has relatively high pressure) to chamber 50B and connects passage 40F (which has relatively low pressure) to chamber 50A, the pressure in chamber 50B will push piston 44 to the right to retract shaft 46. Thus, actuator 38 can use the pressure difference created by pump 30 during normal operation to selectively actuate actuated component 16. Actuated component 16 can be one or more of a number components on gas turbine engine 12 (such as variable vanes) or elsewhere on aircraft 10 (such as slats, flaps, ailerons, elevators, or rudders).

MPSOV 34 is connected to passage 40B, upstream of pump 30, via passages 40H and 40I. Drain piston assembly 36 is connected to passage 40C, downstream of pump 30, via passage 40J. Drain piston assembly 36 is connected to MPSOV 34 via passage 40K. Drain piston assembly 36 is connected to passage 40E, which is connected to fuel manifold 24, via passage 40L.

When gas turbine engine 10 is shut down, one or more valves (not shown) can change pressure in passages 40D and 40H which act on piston 52 within MPSOV 34. This closes the connection between MPSOV 34 and passage 40E, and connects passage 40I to passage 40K. Connecting passage 40I to passage 40K allows fuel flow from drain piston assembly 36, through passage 40K, through MPSOV 34, through passage 40I, through passage 40B, through pump 30, through passage 40G, and into chamber 50A of actuator 38. This fluid flow reduces pressure in passage 40K, which allows piston 54 to move to the left (as depicted in FIG. 1) within drain piston assembly 36, which draws fuel from fuel manifold 24 through passage 40L into drain piston assembly 36. This can be achieved by the EEC (not shown) commanding actuator 38 to extend at the same time in order to increase the total volume of fuel system 14, thus making room for the volume displaced by the moving of piston 54 within drain piston assembly 36.

Figure 2:
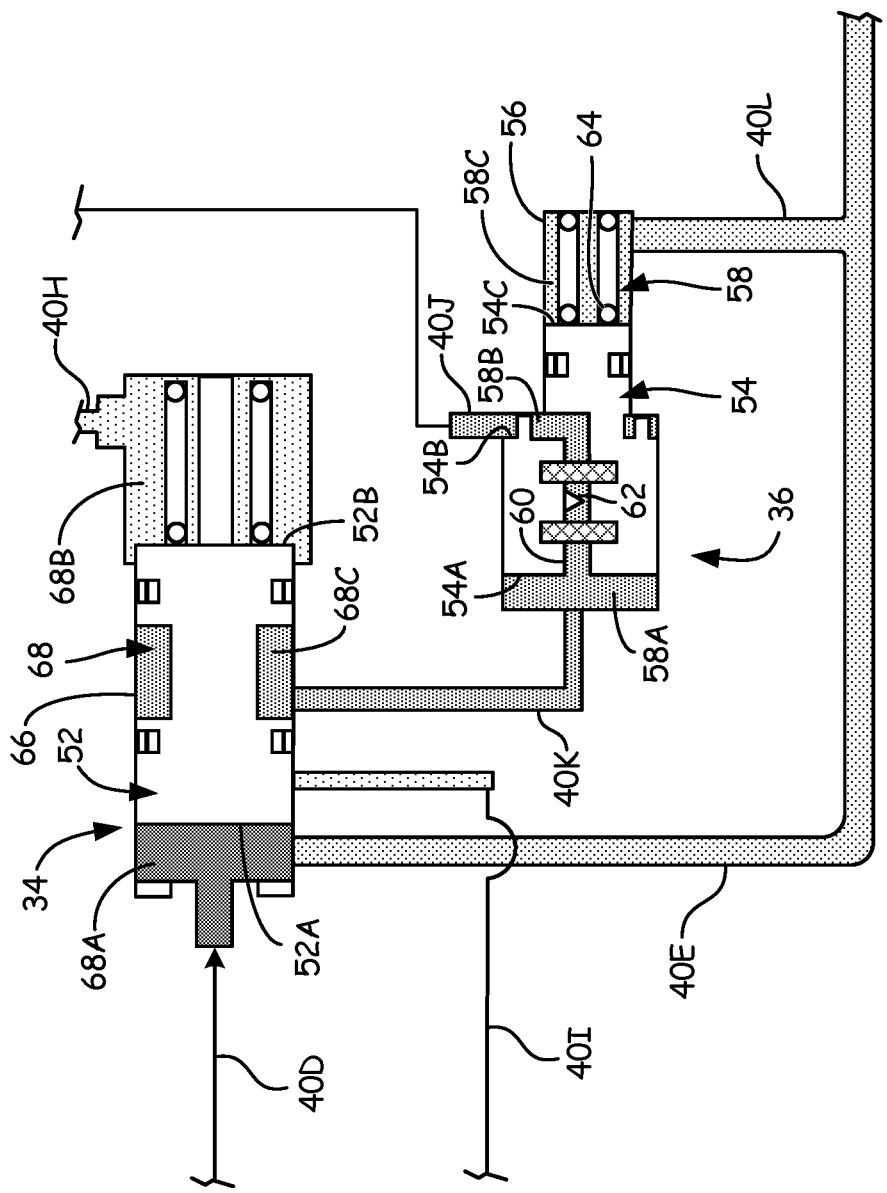
FIG. 2 is an enlarged view of a manifold drain piston assembly and a minimum pressure and shut off valve of the fuel system in FIG. 1.

FIG. 2 is an enlarged view of drain piston assembly 36 and MPSOV 34. Drain piston assembly 36 includes housing 56 defining cylinder 58. Piston 54 is positioned in cylinder 58 to divide cylinder 58 into chambers 58A, 58B, and 58C. Piston 54 has faces 54A, 54B, and 54C that face chambers 58A, 58B, and 58C, respectively. Face 54A has a relatively large area as compared to either of faces 54B and 54C. Chamber 58B is a substantially annular chamber extending circumferentially around piston 54. Passage 60 extends through piston 54 from face 54A to face 54B to fluidically connect chambers 58A and 58B. Orifice 62 is positioned in passage 60 to restrict flow through passage 60, thus creating a pressure drop through passage 60. Passage 40K is connected to housing 56 at chamber 58A. Passage 40J is connected to housing 56 at chamber 58B. Passage 40L is connected to housing 56 at chamber 58C. Piston 54 slides within housing 56 between first and second positions according to the relative pressures in chambers 58A, 58B, and 58C acting on faces 54A, 54B, and 54C. Piston 54 is in the first position as illustrated in FIG. 2 and is in the second position when piston 54 slides to the left. Spring 64 is positioned in chamber 58C to push and bias piston 54 toward the second position.

MPSOV 34 includes housing 66 defining cylinder 68. Piston 52 is positioned in cylinder 68 to divide cylinder 68 into chambers 68A, 68B, and 68C. Piston 52 has faces 52A and 52B that face chambers 68A and 68B, respectively. Chamber 68C is a substantially annular chamber extending circumferentially around piston 52. Passage 40D is connected to housing 66 at chamber 68A. Passage 40H is connected to housing 66 at chamber 68B. Passage 40K is connected to housing 66 at chamber 68C. Passage 40I is connected to housing 66 at a location that is blocked by piston 52 when piston 52 is in a first position (as illustrated in FIG. 1). When piston 52 slides laterally to the left to a second position, chamber 68C connects passage 40I to passage 40K. Piston 52 slides within housing 66 according to the relative pressures in chambers 68A and 68B acting on faces 52A and 52B.

During normal operation of gas turbine engine 12 (shown in FIG. 1) and fuel system 14 (shown in FIG. 1), pump 30 (shown in FIG. 1) can cause pressure to be relatively high downstream of pump 30. Thus, fuel pressure in passage 40D and chamber 68A can act on face 52A to force piston 52 to the right. Thus, MPSOV 34 can allow fuel flow from passage 40D, through chamber 68A to passage 40E. MPSOV 34 can substantially block flow from passage 40K through chamber 68C to passage 40I. Because MPSOV 34 blocks flow through passage 40K during normal operation, pressure in chamber 58A will be substantially the same as pressure in chamber 58B (and also substantially the same as in passages 40J and 40C, shown in FIG. 1). Because face MA has a larger surface area than face MB, pressure in chamber 58A can overcome spring 64 and pressure in chamber 58B (and in chamber 58C) to force piston 54 to the right to reduce the volume in chamber 58C.

Figure 2A:
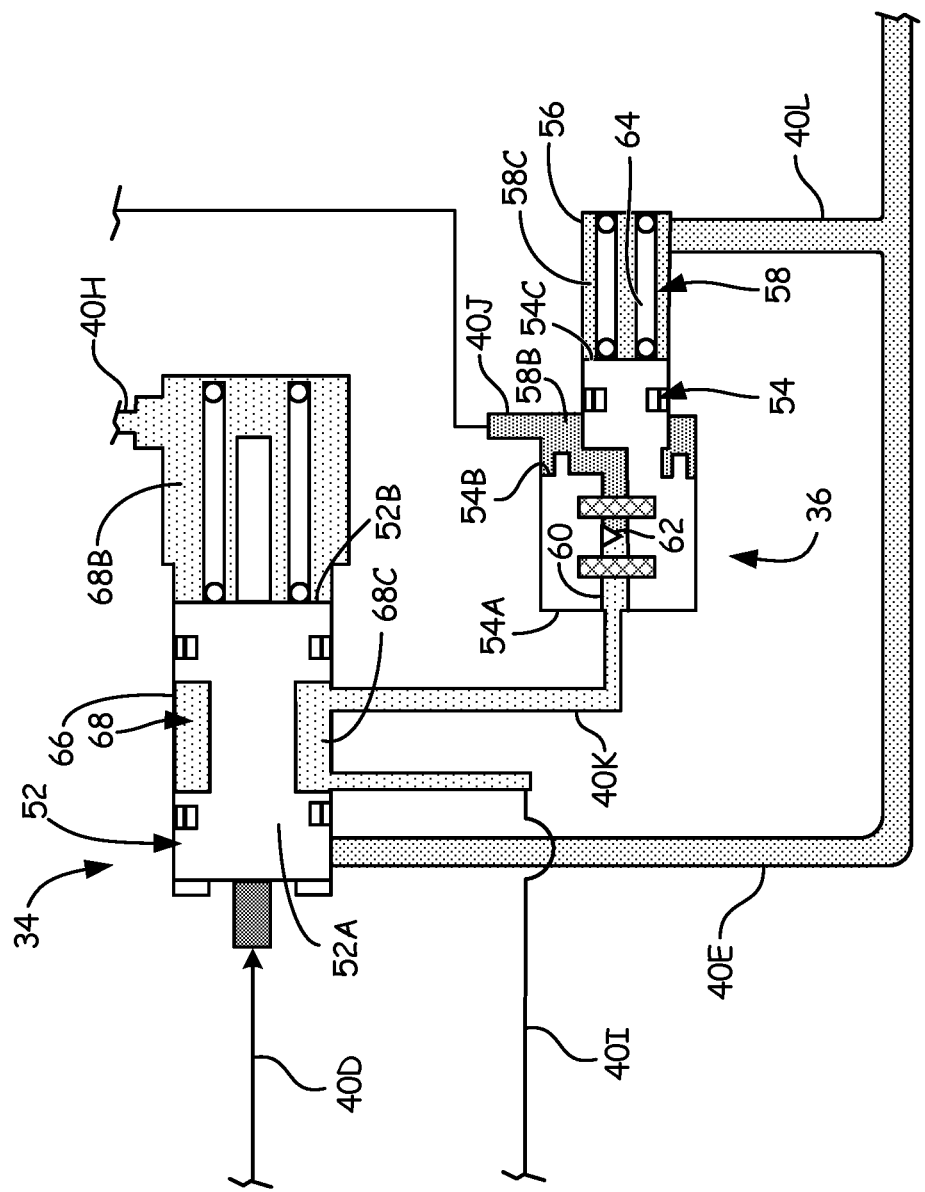
FIG. 2A is an enlarged view of the manifold drain piston assembly and the minimum pressure and shut off valve of the fuel system in FIG. 2 with the pistons of both the manifold drain piston assembly and the minimum pressure and shut off valve shifted to the left.

FIG. 2A is an enlarged view of manifold drain piston assembly 36 and MPSOV 34 of the fuel system in FIG. 2 showing piston 54 of the manifold drain piston assembly and piston 52 of the MPSOV shifted to the left. When gas turbine engine 12 and fuel system 14 are shut down, valves (not shown) can change pressure in passages 40D and 40H which act on piston 52 within MPSOV 34, allowing piston 52 to be forced to the left. When piston 52 moves to the left, chamber 68C connects passage 40K to passage 40I, allowing fuel in chamber 58A of drain piston assembly 36 to drain out passage 40K. Actuator 38 (shown in FIG. 1) can be extended to increase the volume in actuator 38, thus making space for the fuel draining from chamber 58A of drain piston assembly 36. Because orifice 62 restricts flow through passage 60, pressure in chamber 58B will be greater than pressure in chamber 58A which, combined with the force from spring 64, can force piston 54 to the left. When piston 54 moves to the left, the volume of chamber 58C is increased so as to draw fuel from fuel manifold 24. Thus, excess fuel in fuel manifold 24 can be stored in drain piston assembly 36 when gas turbine engine 12 is shut down. In the illustrated embodiment, chamber 58C draws fuel from passage 40L, which draws fuel from passage 40E, which draws fuel from fuel manifold 24. In an alternative embodiment, drain piston assembly 36 can be connected more directly to fuel manifold 24.

When gas turbine engine 12 and fuel system 14 restarts, pump 30 can increase pressure downstream of pump 30, forcing MPSOV 34 to close passage 40K. Closing passage 40K causes pressure to build in chamber 58A of drain piston assembly 36, forcing piston 54 to the right to reduce the volume of chamber 58C and return fuel to fuel manifold 24. By returning fuel from drain piston assembly 36 to fuel manifold 24 upon startup, fuel manifold 24 can be primed faster than without drain piston assembly 36.

Thus, the addition of drain piston assembly 36 allows drain piston assembly 36 to store fuel from fuel manifold 24 during engine shut down, and return that fuel to fuel manifold 24 upon engine start-up. By selectively connecting chamber 58A of drain piston assembly 36 to actuator 38, excess fuel from chamber 58A can be drained and stored in chamber 50A of actuator 38. Although various components have been described with respect to left and right, it should be understood that these directional indicators are used for clarity. Orientation of the components can be varied from those illustrated and described herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, passages 40A-40L need not be shaped and connected precisely as illustrated, but can be modified so long as drain piston assembly 36 is suitably connected to both fuel manifold 24 and actuator 38.

Discussion of Possible Embodiments

The following are non-exclusive descriptions of possible embodiments of the present invention.

A fuel system for a gas turbine engine can include an engine fuel manifold, a hydraulic actuator for actuating in response to a change in pressures within the hydraulic actuator, and a drain piston assembly. The drain piston assembly can be fluidically connected to both the hydraulic actuator and the engine fuel manifold. The drain piston assembly can receive fuel from the engine fuel manifold and send fuel to the hydraulic actuator during engine shut down.

The fuel system of the preceding paragraph can optionally include, additionally and/or alternatively any, one or more of the following features, configurations and/or additional components:

the drain piston assembly can include a housing defining a cylinder and a piston positioned in the cylinder;

the piston can divide the cylinder into first, second, and third chambers;

a first passage can fluidically connect the first chamber to a valve, a second passage can fluidically connect the second chamber to an outlet of a pump, and a third passage can fluidically connect the third chamber to the engine fuel manifold;

the piston can include a passage fluidically connecting the first chamber to the second chamber and a restriction orifice positioned along the passage;

a fuel pump can fluidically connect a fuel tank to the engine fuel manifold, a first actuator passage can fluidically connect the hydraulic actuator to a first fuel supply passage between the fuel tank and the fuel pump, and a second actuator passage can fluidically connect the hydraulic actuator to a second fuel supply passage between the fuel pump and the engine fuel manifold;

a first drain passage can fluidically connect the drain piston assembly to the first fuel supply passage and a second drain passage can fluidically connect the drain piston assembly to the second fuel supply passage;

a valve can be connected to the first fuel supply passage between the fuel tank and both of the first actuator passage and the first drain passage and a fuel metering valve can be connected to the second fuel supply passage between the second actuator passage and the engine fuel manifold;

a valve can selectively fluidically connect the fuel tank to the engine fuel manifold and selectively fluidically connect the drain piston assembly to the hydraulic actuator;

the valve can allow fluid flow from the fuel tank to the engine fuel manifold and restrict fluid flow from the drain piston assembly to the hydraulic actuator in a first position, and the valve can restrict fluid flow from the fuel tank to the engine fuel manifold and allow fluid flow from the drain piston assembly to the hydraulic actuator in a second position;

the valve can be a minimum pressure and shut off valve; and/or the hydraulic actuator can have first and second chambers separated by a piston and configured such that total volume in the hydraulic actuator increases when the piston increases volume in the first chamber and reduces volume in the second chamber.

A method can include flowing fuel from an aircraft fuel tank to a fuel manifold of a gas turbine engine when the gas turbine engine is operating. Fuel can flow from the engine manifold to a drain piston assembly and from the drain piston assembly to a hydraulic actuator when the gas turbine engine is shut down.

The method of the preceding paragraph can optionally include, additionally and/or alternatively any, one or more of the following features, configurations and/or additional steps:

fuel from the drain piston assembly can be returned to the fuel manifold when the gas turbine engine is restarted;

a piston can be moved within the drain piston assembly to draw fuel from the engine manifold to the drain piston assembly;

a piston can be moved within the hydraulic actuator to increase total volume within the hydraulic actuator for storing fuel from the drain piston assembly when the gas turbine engine is shut down;

a valve can be actuated to allow fuel flow from the aircraft fuel tank to the fuel manifold and to block fuel flow from the drain piston to the hydraulic actuator when the gas turbine engine is operating, and the valve can be actuated to block fuel flow from the aircraft fuel tank to the fuel manifold and to allow fuel flow from the drain piston to the hydraulic actuator when the gas turbine engine is shut down; and/or fuel can flow from a first chamber in the drain piston assembly, through a hole in a piston within the drain piston assembly, to a second chamber in the drain piston assembly when the gas turbine engine is shut down.

A method for draining an engine fuel manifold can include flowing fuel from a fuel pump to a drain piston assembly to move a piston in the drain piston assembly from a first position to a second position. Fuel can flow from the drain piston assembly to a hydraulic actuator as the piston moves from the first position to the second position. Fuel can flow from the engine fuel manifold to the drain piston assembly when the piston moves from the first position to the second position.

The method of the preceding paragraph can optionally include the following:

fuel can flow from a first chamber in the drain piston assembly, through a hole in the piston, to a second chamber in the drain piston assembly.

The invention claimed is:

1. A method comprising:
   flowing fuel from an aircraft fuel tank to an engine fuel manifold of a gas turbine engine when the gas turbine engine is operating; and
   flowing fuel when the gas turbine engine is shutdown from the engine fuel manifold to a drain piston assembly and from the drain piston assembly to a hydraulic actuator for actuating at least one component of the gas turbine engine when the gas turbine engine is shut down.

2. The method of claim 1, and further comprising:
   returning fuel from the drain piston assembly to the fuel manifold when the gas turbine engine is restarted.

3. The method of claim 1, and further comprising:
   moving a piston within the drain piston assembly to draw fuel from the engine manifold to the drain piston assembly.

4. The method of claim 1, and further comprising:
   moving a piston within the hydraulic actuator to increase total volume within the hydraulic actuator for storing fuel from the drain piston assembly when the gas turbine engine is shut down.

5. The method of claim 1, and further comprising:
   actuating a valve to allow fuel flow from the aircraft fuel tank to the fuel manifold and to block fuel flow from the drain piston to the hydraulic actuator when the gas turbine engine is operating; and
   actuating the valve to block fuel flow from the aircraft fuel tank to the fuel manifold and to allow fuel flow from the drain piston to the hydraulic actuator when the gas turbine engine is shut down.

6. The method of claim 1, and further comprising:
   flowing fuel from a first chamber in the drain piston assembly, through a hole in a piston within the drain piston assembly, to a second chamber in the drain piston assembly when the gas turbine engine is shut down.

7. A method for draining an engine fuel manifold comprising:
   moving a piston in a valve from a first position to a second position to allow fluid to flow between a drain piston assembly and a hydraulic actuator;
   flowing fuel from a fuel pump to the drain piston assembly to move a piston in the drain piston assembly from a first position to a second position;
   flowing fuel from the drain piston assembly to a hydraulic actuator as the piston in the drain piston assembly moves from the first position to the second position; and
   flowing fuel from the engine fuel manifold to the drain piston assembly when the piston in the drain piston assembly moves from the first position to the second position.

8. The method of claim 7, and further comprising:
   flowing fuel from a first chamber in the drain piston assembly, through a hole in the piston, to a second chamber in the drain piston assembly.

9. A fuel system for a gas turbine engine, the fuel system comprising:
   an engine fuel manifold;
   a hydraulic actuator for actuating at least one component of the gas turbine engine in response to a change in pressures within the hydraulic actuator;
   and a drain piston assembly fluidically connected to both the hydraulic actuator and the engine fuel manifold, wherein the drain piston assembly receives fuel from the engine fuel manifold and sends fuel to the hydraulic actuator during engine shut down.

10. The fuel system of claim 9, wherein the drain piston assembly comprises:
    a housing defining a cylinder; and
    a piston positioned in the cylinder.

11. The fuel system of claim 10, wherein the piston divides the cylinder into first, second, and third chambers.

12. The fuel system of claim 11, and further comprising:
    a valve;
    a pump having an outlet;
    a first passage fluidically connecting the first chamber to the valve;
    a second passage fluidically connecting the second chamber to the outlet of the pump; and
    a third passage fluidically connecting the third chamber to the engine fuel manifold.

13. The fuel system of claim 11, wherein the piston comprises:
    a passage fluidically connecting the first chamber to the second chamber; and
    a restriction orifice positioned along the passage.

14. The fuel system of claim 1, and further comprising:
    a fuel tank;
    a fuel pump fluidically connected between the fuel tank and the engine fuel manifold;
    a first actuator passage fluidically connecting the hydraulic actuator to a first fuel supply passage between the fuel tank and the fuel pump; and
    a second actuator passage fluidically connecting the hydraulic actuator to a second fuel supply passage between the fuel pump and the engine fuel manifold.

15. The fuel system of claim 14, and further comprising:
    a first drain passage fluidically connecting the drain piston assembly to the first fuel supply passage; and
    a second drain passage fluidically connecting the drain piston assembly to the second fuel supply passage.

16. The fuel system of claim 15, and further comprising:
    a valve connected to the first fuel supply passage between the fuel tank and both of the first actuator passage and the first drain passage; and
    a fuel metering valve connected to the second fuel supply passage between the second actuator passage and the engine fuel manifold.

17. The fuel system of claim 1, and further comprising:
    a valve comprising:
        a cylinder; and
        a piston movable between a first position and a second position within the cylinder, wherein when the piston is in the first position the valve establishes fluid communication between a fuel tank and the engine fuel manifold and when the piston is in the second position the valve establishes fluid communication between the drain piston assembly and the hydraulic actuator.

18. The fuel system of claim 17, wherein the valve allows fluid flow from the fuel tank to the engine fuel manifold and restricts fluid flow from the drain piston assembly to the hydraulic actuator in a first position, and wherein the valve restricts fluid flow from the fuel tank to the engine fuel manifold and allows fluid flow from the drain piston assembly to the hydraulic actuator in a second position.

19. The fuel system of claim 17, wherein the valve is a minimum pressure and shut off valve.

20. The fuel system of claim 9, wherein the hydraulic actuator has first and second chambers separated by a piston and configured to increase a total volume in the hydraulic actuator when the piston increases a volume in the first chamber and reduces volume in the second chamber.

\* \* \* \* \*